(12) United States Patent
Templeton et al.

(10) Patent No.: US 8,121,784 B2
(45) Date of Patent: Feb. 21, 2012

(54) GPS TRIGGERED NARRATION AND RECORDING FOR DRIVE EVENTS

(75) Inventors: Jamie S. Templeton, Redding, CT (US); David Tarabochia, Manhattan Beach, CA (US)

(73) Assignee: Maritz, Inc., Fenton, MO (US)

( * ) Notice: Subject to any disclaimer, the term of this patent is extended or adjusted under 35 U.S.C. 154(b) by 212 days.

(21) Appl. No.: 12/203,216

(22) Filed: Sep. 3, 2008

(65) Prior Publication Data
US 2009/0069972 A1   Mar. 12, 2009

Related U.S. Application Data

(63) Continuation-in-part of application No. 11/851,955, filed on Sep. 7, 2007.

(51) Int. Cl.
*G01M 17/00* (2006.01)
(52) U.S. Cl. ........... 701/207; 701/213; 701/29; 340/505
(58) Field of Classification Search ......... 701/213–215, 701/28, 29, 201, 209, 207; 340/505, 523–526, 340/539.13, 572.8; 455/441, 41.2
See application file for complete search history.

(56) References Cited

U.S. PATENT DOCUMENTS

| | | |
|---|---|---|
| 6,600,418 B2 | 7/2003 | Francis et al. |
| 6,912,398 B1 | 6/2005 | Domnitz |
| 6,920,330 B2 | 7/2005 | Caronni et al. |
| 7,020,494 B2 | 3/2006 | Spriestersbach et al. |
| 7,082,344 B2 | 7/2006 | Ghaffari |
| 7,117,374 B2 | 10/2006 | Hill et al. |
| 7,199,725 B2 | 4/2007 | Gilfix et al. |
| 7,218,941 B1 | 5/2007 | Kubo et al. |
| 7,272,502 B2 * | 9/2007 | Lee et al. ...................... 701/214 |
| 7,397,370 B2 * | 7/2008 | Bratkovski ............... 340/539.26 |
| 7,486,181 B2 * | 2/2009 | Olsen et al. .................. 340/505 |
| 2002/0070879 A1 | 6/2002 | Gazit et al. |
| 2003/0024975 A1 | 2/2003 | Rajasekharan |
| 2003/0100315 A1 | 5/2003 | Rankin |
| 2003/0155413 A1 | 8/2003 | Kovesdi et al. |
| 2003/0207683 A1 | 11/2003 | Lempio et al. |
| 2004/0017475 A1 * | 1/2004 | Akers et al. ................ 348/207.1 |

(Continued)

FOREIGN PATENT DOCUMENTS

CA    2247128    8/1997

OTHER PUBLICATIONS

Sightseeing guided by GPS, Mar. 26, 2007 at http://www.springwise.com.

(Continued)

*Primary Examiner* — Thomas Black
*Assistant Examiner* — Marthe Marc-Coleman
(74) *Attorney, Agent, or Firm* — Senniger Powers LLP (57) ABSTRACT

Automatically presenting content to an occupant of a vehicle as the vehicle traverses a route (e.g., during a test drive or other drive event). Content items are associated with GPS coordinates the route. A GPS device on the vehicle identifies the vehicle location as the vehicle traverses the route, and content item associated with particular locations is presented to the occupant of the vehicle. Audio and/or video of the occupant may be captured and stored on a computing device remote from the vehicle. The captured audio and/or video represents feedback from the occupant during the drive event.

9 Claims, 3 Drawing Sheets

U.S. PATENT DOCUMENTS

| | | |
|---|---|---|
| 2004/0110515 A1 | 6/2004 | Blumberg et al. |
| 2005/0003839 A1 | 1/2005 | Tripp |
| 2005/0085998 A1* | 4/2005 | Bless et al. ............... 701/209 |
| 2005/0205719 A1 | 9/2005 | Hendrickson et al. |
| 2005/0245271 A1 | 11/2005 | Vesuna |
| 2006/0022030 A1 | 2/2006 | Boothroyd |
| 2006/0055564 A1* | 3/2006 | Olsen et al. ............... 340/994 |
| 2006/0061476 A1 | 3/2006 | Patil et al. |
| 2006/0105783 A1 | 5/2006 | Giraldin et al. |
| 2006/0135183 A1* | 6/2006 | Zavada et al. ............ 455/457 |
| 2006/0164236 A1 | 7/2006 | Siegl et al. |
| 2006/0208860 A1 | 9/2006 | Park et al. |
| 2006/0230337 A1 | 10/2006 | Lamont et al. |
| 2006/0252374 A1 | 11/2006 | Ban et al. |
| 2006/0292984 A1* | 12/2006 | Teate et al. ............... 455/41.2 |
| 2007/0021122 A1* | 1/2007 | Lane et al. ............... 455/441 |
| 2007/0075873 A1 | 4/2007 | Yang et al. |
| 2007/0124507 A1* | 5/2007 | Gurram et al. ............ 710/1 |
| 2007/0271014 A1 | 11/2007 | Breed |
| 2007/0271015 A1* | 11/2007 | Bauer et al. ............... 701/33 |
| 2008/0068165 A1* | 3/2008 | DeWitt et al. ............ 340/572.1 |
| 2008/0319604 A1* | 12/2008 | Follmer et al. ............ 701/35 |
| 2010/0049433 A1* | 2/2010 | Martin et al. ............. 701/201 |
| 2010/0198510 A1* | 8/2010 | Rothschild ............... 701/213 |

OTHER PUBLICATIONS

Automotive Events to Unveil Drivetracks At MPG Track Day, Oct. 1, 2007 at http://www2.automotive-events.com.

Drivetracks GPS based soundtracks for driving at www.hear-here.com.au/drivetracks.

* cited by examiner

GPS TRIGGERED NARRATION AND RECORDING FOR DRIVE EVENTS

BACKGROUND OF THE INVENTION

Drive events include, for example, product training for sales personnel, car clinics for research or for journalists, and test drives or "ride-and-drives" for consumers. Drive events enable the driver to experience the vehicle on either a public street or a closed course designed to demonstrate the capabilities and specifications of the vehicle (e.g., suspension, performance, safety, etc.). In existing systems, a representative of the vehicle manufacturer or related entity accompanies the driver during the drive event. The representative identifies specific features of the vehicle during a narration as the vehicle traverses the course. Typically, numerous drivers participate in each event and the representative must repeat the narration for each of the drivers.

Existing systems, however, rely on the representative or product specialist to accurately repeat the narration, and repeat the narration at the appropriate time, for each driver. Existing systems also rely on the representative to interpret and record any feedback or response from the driver during the drive event.

SUMMARY OF THE INVENTION

In one embodiment, the invention comprises a system including a device for receiving position information from a radio navigation system, such as a global positioning system (GPS). The device is positioned on a vehicle so that the position information describes a position of the vehicle. A memory area stores data defining a plurality of predetermined locations along a route and stores a plurality of content items, each associated with at least one of the plurality of predetermined locations, the content items relating to a characteristic associated with the vehicle. A presentation device is positioned on the vehicle and a processor is positioned on the vehicle, configured to execute computer-executable instructions for:
  receiving the position information via the device as the vehicle traverses the route, the received position information corresponding to at least one of the plurality of content items stored in the memory area;
  selecting an item of content from the plurality of content items stored in the memory area as a function of the received position information; and presenting via the presentation device the selected content item from the memory area to an occupant of the vehicle.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
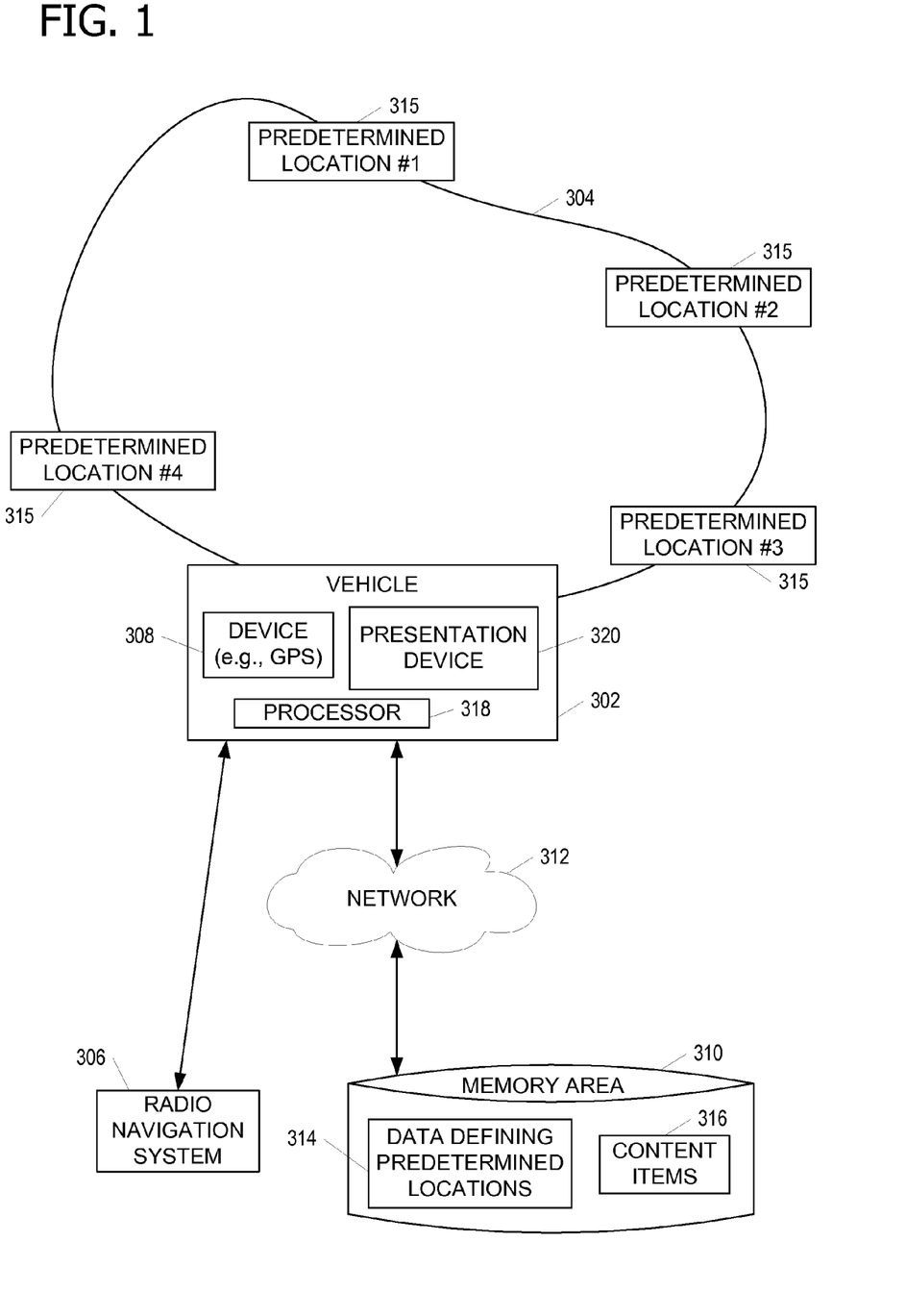
FIG. 1 is a block diagram illustrating a vehicle presenting content to an occupant while traversing a route using a radio navigation system.

Referring first to FIG. 1, a block diagram illustrates a vehicle 302 presenting content to an occupant while traversing a route 304 using a radio navigation system 306. A device 308, positioned on the vehicle 302, receives position information from the radio navigation system 306. In an embodiment, the radio navigation system 306 comprises a satellite navigation system such as a global positioning system. The position information (e.g., GPS coordinates) describes a position of the vehicle 302. A memory area 310 is accessible by the vehicle 302, for example, via a network 312. The memory area 310 stores data 314 defining a plurality of predetermined locations 315 such as predetermined location #1 through predetermined location #4 along the route 304. The memory area 310 further stores a plurality of content items 316 each associated with at least one of the plurality of predetermined locations 315. The plurality of content items 316 relates to a characteristic associated with the vehicle 302.

A processor 318 is also positioned on the vehicle 302. The processor 318 is configured to execute computer-executable instructions for receiving the position information via the device 308 as the vehicle 302 traverses the route 304. The received position information corresponds to at least one of the plurality of content items 316 stored in the memory area 310. The processor 318 is further configured to execute computer-executable instructions for selecting an item of content from the plurality of content items 316 stored in the memory area 310 as a function of the received position information, and for presenting the selected content item 316 from the memory area 310 to an occupant of the vehicle 302 via a presentation device 320 positioned on the vehicle 302.

Aspects of the invention are operable with drive events such as product training for sales personnel, car clinics for research or for journalists, test drives or "ride-and-drives" for consumers, and the like. In a product training embodiment, the invention educates the sales personnel about the vehicle 302. In a test drive embodiment, the invention assists the sales personnel in explaining the features of the vehicle 302 to the driver. This minimizes the dependence of the sales personnel on product knowledge, perhaps focusing the sales personnel more on developing a relationship with the driver. Aspects of the invention also help to ensure that instructions are delivered to the occupant in a consistent manner (e.g., turn right, accelerate at full throttle, etc).

In one embodiment of the invention, the invention may be implemented with a portable computer, such as a laptop on the vehicle 302, including the processor 318. The device 308 would be a GPS card plugged into the laptop for receiving GPS signals and determining the location of the vehicle 302. The presentation device 320 would be the video screen and/or speakers of the laptop. Alternatively, the laptop could interface with a video screen and/or the audio system of vehicle, such as via a Bluetooth protocol. The memory area 310 would be a drive of the laptop or a tangible computer readable storage media (e.g., a CD) including the data 314 and the content items 316.

Alternatively, the laptop may access the memory 310 via the network 312. For example, the route 304 may be serviced by a WiFi network and the laptop may access a remote memory area via the WiFi network. As another example, a temporary wireless network may be set up to cover the route 304 and the laptop would access the memory 310 via the temporary wireless network.

In one embodiment, a Garmin operating system (OS) for GPS Navigation may be installed on the laptop. Garmin OS is a consumer level system pre-installed on Garmin GPS handheld products. Thus, the Garmin OS is employed as the GPS device 308. No modifications need to be made to the installed OS. Garmin POI Loader available from Garmin is used, as intended by Garmin, to convert a directory of files into a binary file and transfer the binary file from the laptop into the memory storage on a Garmin GPS unit.

A text editor, such as TourPoint Editor, is used to create a list of POI's (Points Of Interest), corresponding to the data 314 defining the predetermined locations at which content items will be presented. The output file has a .GPX extension. The .GPX file follows a schema that associates a specific Latitude and Longitude with a number of data points. As a specific example, .GPX for a single location:

```
<?xml version="1.0" encoding="Windows-1252" standalone="no" ?>
<gpx xmlns="http://www.topografix.com/GPX/1/1" creator="Human"
        version="1.1"
xmlns:xsi=http://www.w3.org/2001/XMLSchema-instance
xsi:schemaLocation="http://www.topografix.com/GPX/1/1/
        http://www.topografix.com/GPX/1/1/gpx.xsd">
<wpt lat="59.921055008" lon="-103.054223107">
<ele>122.863281</ele>
<time>2007-05-16T11:59:06Z</time>
<name>Fairfax and Van Ness avenues</name>
<sym>Cross Roads</sym>
</wpt>
</gpx>
```

Linked Audio Files

In one embodiment, audio files are used as the content items 316 in support of a drive program. The files are .mp3 files created via actual voice recording of a lead professional driver, a voice-over talent, or product engineer, or any other person, or by text-to-speech. Files are stored inside of a folder within the TourPoint directory for a specific program experience. The audio file is linked to a specific set of GPS Coordinates, and speaks to a vehicle attribute the driver (and participants) is experiencing at that given moment. For example, if the route takes the vehicle to a freeway approach ramp, it may be linked to an audio file talking about throttle response, power (horsepower), and acceleration, cueing the driver (and participants) on what to look for, or describing what they are experiencing in the vehicle at that specific point in time. Other examples might be transmission gear-logic when going up a hill, or the ride quality while going over bumpy roads, or simply reminding the participants to take note of the interior comfort and leg room available inside the vehicle. Aside from the vehicle attributes, directions may also be recorded that the driver should follow (turn left at the light ahead, turn right on Torrance Blvd. ahead, or any other necessary direction). Thus, it prescribes the route the driver must follow. Directions may also be recorded that the driver should follow to try a feature of the vehicle (adjust air temperature, turn on the audio system, note the navigation screen, or any other accessory of the vehicle).

There are other options, including web based solution that will produce a .GPX file. It would also be easy to produce custom GPS software, or, because the .GPX schema is standardized, the GPX file could hand coded (type it in NotePad) and loaded onto the GPS device 308.

Thus, in one form, the invention includes a method. A route 304 for the vehicle 302 to traverse is defined. Each of the plurality of content items 316 is associated with at least one GPS coordinate along the defined route 304. The content items 316 are stored in the memory area 310. The GPS coordinates of the vehicle 302 are determined, such as by device 308, as the vehicle 304 traverses the determined route 302. An item of content from the plurality of content items 316 stored in the memory area 310 is selected as a function of the determined GPS coordinates of the vehicle. The selected content item from the memory area 310 is presented via the presentation device 320 to an occupant of the vehicle.

The processor 318 also determines which content item 316 should be played when the vehicle is between two predefined locations. For example, the processor determines first GPS coordinates of the vehicle at a first location and determines second GPS coordinates of the vehicle at a second location. Thereafter, the processor determines whether to select the item of content as a function of the first GPS coordinates or as a function of the second GPS coordinates. For example, the first location may be closer to a predefined location than the second location so the processor would render the content item 316 associated with the first location.

Enhancements

Picture or video clips appearing during the drive experiences may be displayed. In general, displays need to trigger and adhere to current legal regulations. Driver (and participant) feedback may be recorded. For example, the driver may make a verbal comment which is recorded. Alternatively, the program may direct the driver to pull over and answer a few multiple choice questions which appear on the screen of the laptop.

RFID Tags

Figure 2:
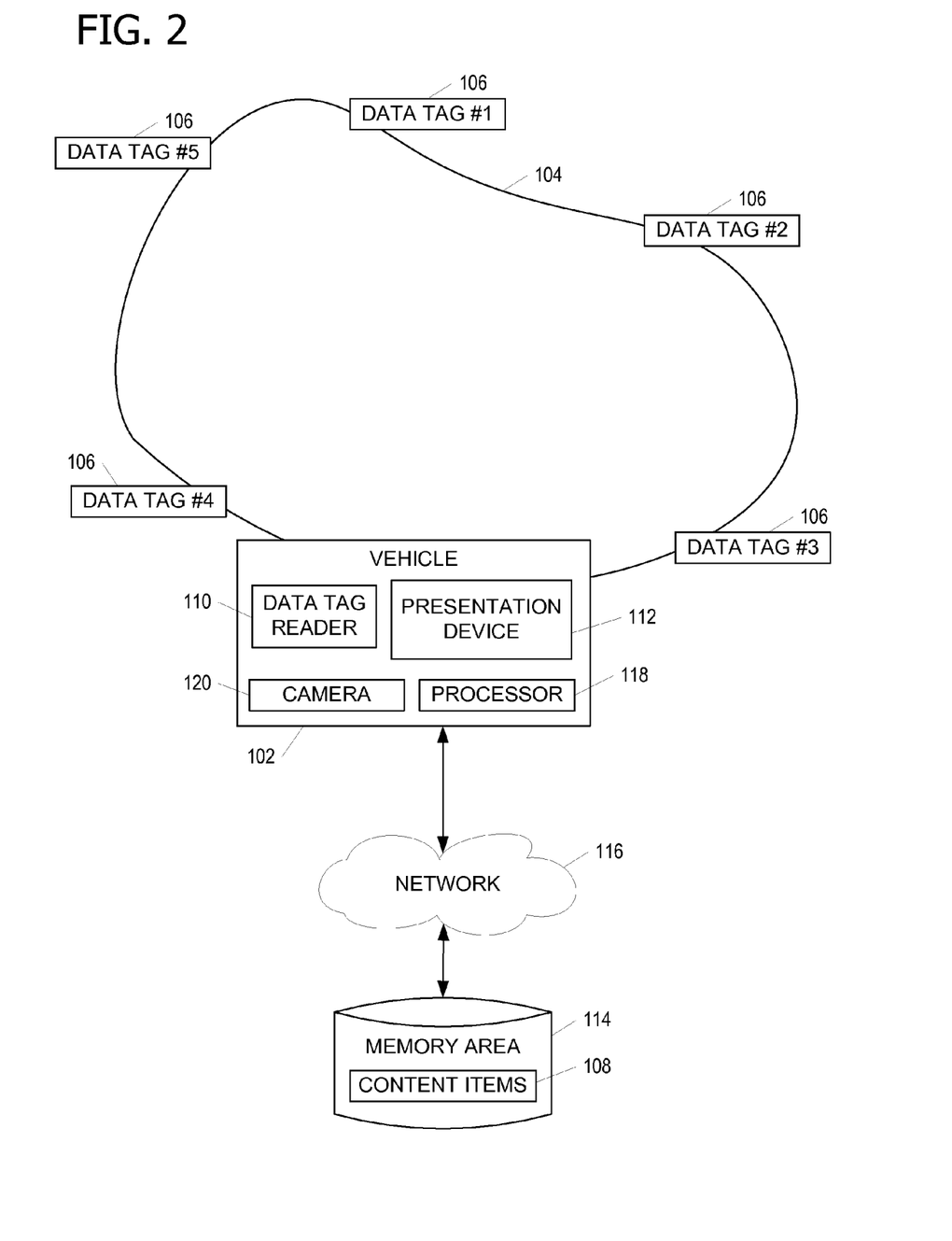
FIG. 2 is a block diagram illustrating a vehicle traversing a route reading data tags placed along the route.
Figure 3:
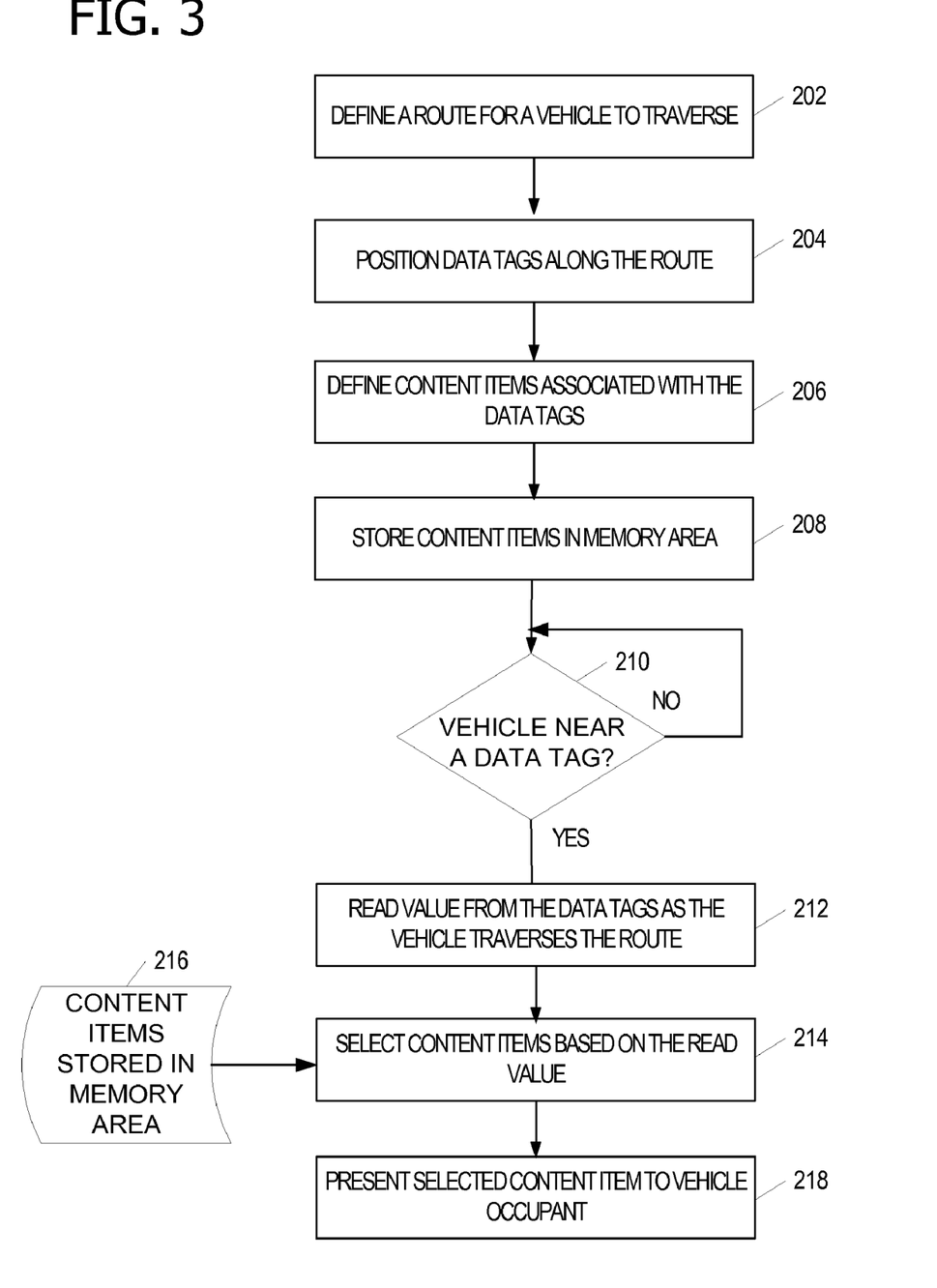
FIG. 3 is a flow chart illustrating operation of a vehicle presenting content to an occupant while traversing a route.

Referring next to FIGS. 2 and 3, an alternative embodiment is illustrated which employs RFID tags to mark position. Many of the features of RFID system are also applicable to the above GPS system, and visa versa. One difference between the systems is determining the location of the vehicle. In the GPS system above, the vehicle location is determined by determining the GPS coordinates of the vehicle along the route. In the RFID system below, the vehicle location is determined by interaction with RFID tags placed along the route.

FIG. 2 is a block diagram illustrating a vehicle 102 traversing a route 104 reading data tags 106 such as data tag #1 through data tag #5 placed along the route 104. The route 104 may be on a closed course, on private property, or on a public road. In an embodiment, the invention includes an automated audio narration for use in the moving vehicle 102. The narration is pre-recorded and describes features of the vehicle 102, the route 104, or any other characteristic associated with the vehicle 102. The narration may also include instructions for navigating the car, or for demonstrating features of the vehicle 102. The narration is recorded prior to allowing drivers to operate the vehicle 102. The narration includes a plurality of content items 108. Each content item 108 is associated with a corresponding data tag 106 or predetermined location along the route 104. At each data tag 106 or predetermined location, the appropriate content item 108 is rendered. For example, the content item 108 may be rendered to the user as audio, video, or both.

Some embodiments of the invention are described and illustrated herein with reference to radio frequency identification (RFID) and/or global positioning system technology. Aspects of the invention are not limited to such embodiments, and are operable with other technologies that enable the functionality of the invention. For example, RFID readers could be replaced with optical scanners or image analysis devices to implement embodiments of the invention.

Referring again to FIG. 2, a data tag reader 110 reads each of the plurality of data tags 106. The data tag reader 110 is positioned on the vehicle 102. A presentation device 112 is also positioned on the vehicle 102. In one embodiment, the presentation device 112 includes a wireless connection for accessing one or more of the following presentation devices: a speaker, a video display, a speaker embedded in the vehicle 102, and a display embedded in the vehicle 102.

A memory area 114 is accessible via a network 116, for example, by a computing device (e.g., laptop) within the vehicle 102. The connection to the network 116 may be wired or wireless. The memory area 114 stores the plurality of content items 108 each associated with at least one of the plurality of data tags 106. The plurality of content items 108 relates to a characteristic associated with the vehicle 102. In an embodiment, the plurality of content items 108 includes one or more of the following: narration, vehicle training information, prompts, questions, and warnings. In an embodiment, the characteristic relates to a feature of the vehicle 102 or route 104. Alternatively or in addition, the characteristic includes an instruction for navigating the vehicle 102 along the route 104.

In an embodiment (not shown), the content items 108 are stored directly on the data tags 106.

A processor 118 is positioned on the vehicle 102 and configured to execute computer-executable instructions for reading a value from each of the plurality of data tags 106 via the data tag reader 110 as the vehicle 102 traverses the route 104, selecting an item of content from the plurality of content items 108 stored in the memory area 114 as a function of the read value, and presenting via the presentation device 112 the selected content item 108 from the memory area 114 to an occupant of the vehicle 102. The read value corresponds to at least one of the plurality of content items 108 stored in the memory area 114. In an embodiment, the processor 118 is embedded in the vehicle 102.

The computer-executable instructions and hardware components described and illustrated herein constitute exemplary means for reading the value from each of the plurality of data tags 106 via the data tag reader 110 as the vehicle 102 traverses the route 104, exemplary means for selecting the item of content from the plurality of content items 108 stored in the memory area 114 as a function of the read value, and exemplary means for presenting via the presentation device 112 the selected content item 108 from the memory area 114 to an occupant of the vehicle 102.

In an embodiment, the data tag reader 110 comprises an RFID reader, and the data tags 106 are smart tags such as RFID tags. RFID technology refers, in an embodiment, to passive smart tags (miniature antenna-containing tags requiring no internal power supply) that may be embedded in or attached to a product or material to convey information that may be read by a scanner. Generally, conductive or passive smart tags include a data circuit and an antenna. In particular, smart tags include a semiconductor, a coiled, etched, or stamped antenna, a capacitor, and a substrate on which the components are mounted or embedded. A protective covering is typically used to encapsulate and seal the substrate. RFID smart tag technology is known and understood by those skilled in the art, and a detailed explanation thereof is not necessary for purposes of describing embodiments of the method and system according to the present invention.

In general, RFID systems and other data tag systems include readers and tags in which the tags generate an electromagnetic response to an electronic signal from a reader. The response signal is read by the reader, typically with a readable range on the order of a few feet, though broader or narrower ranges are possible. The signal generated by the tag includes information that identifies the tag or the article comprising the tag. Aspects of the invention are operable with any form of data tag 106 including, but not limited to, a smart tag and an active or passive radio frequency identification (RFID) tag. In general, RFID tags may be read-only tags, which include fixed data, or they may be read-write tags, which allow new information to be added.

In an embodiment, the data tag 106 stores a value corresponding to one or more of the content items 108. The data tag reader 110 interrogates each data tag 106 along the route 104.

Alternatively or in addition, aspects of the invention include a camera 120 for capturing audio and video data of the driver or other occupants of the vehicle 102. Integrating the camera 120 with other components in the system enables embodiments of the invention to administer instructions and questions, and subsequently capture the occupant's answers, comments, etc. For example, in a dynamic evaluation, aspects of the invention are configured to instruct the respondent to accelerate at full throttle. A few seconds later, another data tag 106 triggers questions asking the respondent to describe the acceleration (or the transmission, or the engine sound, etc). Both the video and audio of the response is captured live. In an embodiment, voice activation recording minimizes silent time by only recording when there is a response to a question.

In an embodiment, network 116 is a wireless network. The captured live audio and video is streamed over the wireless network in an embodiment. The wireless network is configured to cover the entire drive course or route 104. The vehicle 102 has the capability to connect to the network 116 while on the course. An additional computing device (including another processor) located remotely from the vehicle 102 is also on the network 116 and receives the captured stream of audio and/or video in real time from the vehicle 102. The live audio and video enables monitoring and reporting on the response of the driver and passengers.

In an embodiment, the captured data is correlated with the presented, selected content to create an analysis of the vehicle 102.

Embodiments of the invention also include voice recognition software for transcribing the captured data to enable textual queries of the captured data. For example, transcribed comments in conjunction with text analysis provide insight into the occupant's experience during the drive event. Alternatively or in addition, the voice recognition software enables the capture of structured data such as rating scale data. Rating scale data in known in the art, and typically includes assigning values to predefined responses available for selection by the occupant. The voice recognition software also enables real-time data collection during drive events. Both the voice recognition embodiment and the non-voice recognition embodiment increase the accuracy of capturing the occupant's detailed answers. With existing systems, the product specialist records the answers by hand, which decreases accuracy and the amount of information that may be recorded.

In an embodiment (not shown), a plurality of vehicles traverse the route 104 at the same time. Each vehicle triggers the rendering of the content items 108 as the vehicles traverse the route 104. The computing device, located remotely from the vehicles, captures the live video and/or audio streams from each vehicle simultaneously.

In one embodiment, it is contemplated that a system according to the invention may employ both GPS coordinates and RFID tags to identify the vehicle position. For example, RFID tags may be located along the route at particular locations to trigger certain content presentation and GPS coordinates along the route may be used to trigger other content presentation.

Referring next to FIG. 3, a flow chart illustrates operation of a vehicle presenting content to an occupant while traversing a route. A route is defined for a vehicle to traverse at 202. A plurality of data tags are positioned along the defined route at 204. A plurality of content items are defined and associated with at least one of the plurality of data tags at 206. The plurality of content items is stored in a memory area at 208. If the vehicle is near a data tag at 210 as the vehicle traverses the route, a value is read from each of the plurality of data tags via the data tag reader at 212. The read value corresponds to at least one of the plurality of content items stored in the memory area at 216. An item of content is selected from the plurality of content items stored in the memory area as a function of the read value at 214. The selected content item from the memory area is presented via the presentation device to the occupant of the vehicle at 218.

If the vehicle is near two or more data tags or moving fast enough to encounter two data tags within a predefined time period, embodiments of the invention interrogate the multiple data tags to determine which data tag should take priority. For example, if two data tags are interrogated by the data tag reader of the vehicle, the data tag that is positioned after the other data tag along the route is used to select the appropriate content item for rendering to the occupant. For example, if a first value from a first data tag is read and a second value from a second data tag is read, embodiments of the invention determine whether to select the item of content as a function of the first value or as a function of the second value. In an embodiment, the determining operation occurs based on a signal strength associated with the first data tag and the second data tag. For example, the value read from the data tag with the greater signal strength is used to identify and obtain the content item.

Alternatively or in addition, a predefined priority is associated with each data tag. For example, the priority corresponds to a priority value either stored on the data tag or associated with the data tag via an identifier stored on the data tag. Embodiments of the invention select, as a function of the priority value read from the data tag or identified from the data tag, the data tag from which to read the value corresponding to a content item.

Exemplary Embodiments

In an embodiment, the invention perform as an automated, mobile, narration system by combining off-the-shelf hardware and software in a way that differs from the intended use of the software and hardware components. Exemplary hardware for use with embodiments of the invention includes a laptop to travel in the vehicle (e.g., vehicle 302), an RFID reader associated with the vehicle and/or laptop, a plurality of RFID tags dispersed throughout the course or test drive route, an automotive power adapter for the laptop and the RFID reader, and other adapters such as a universal serial bus (USB) to serial adapter for connecting the hardware components to the laptop. In addition, some embodiments may include a long-range RFID antenna associated with the vehicle, long-range RFID tags along the route, and a system for recording or transmitting audio and/or video from the vehicle to another computing device.

Exemplary software for use with embodiments of the invention includes one or more of the following home automation software: HomeSeer2 software for monitoring and controlling devices external to a computer, the iAutomate RFID plug-in for HomeSeer2 to add RFID functionality to HomeSeer2, and Audacity for recording and editing audio. For example, HomeSeer2 is intended for use within a home residence and includes software for monitoring and controlling devices within the home. The home residence implementation of the HomeSeer2 system includes a permanent, non-mobile installation of the software on a computer along with connections to any number of devices associated with appliances, lights, motion detectors, etc. in the home. The RFID plug-in to the HomeSeer2 software enables the computer to track RFID tags on each of these devices (e.g., appliances, etc.).

In contrast, aspects of the present invention include the HomeSeer2 software with the RFID plug-in installed on the mobile laptop that rides in the vehicle. In such an implementation, the mobility of the system (e.g., laptop, software, RFID reader) is reversed from the original intended installation of the components.

In another embodiment of the invention, it is contemplated that successive vehicles reading a data tag (or GPS coordinates) may present different content, sometimes referred to as relational uses of the system of the invention. For example, assume two vehicles 102, a leading vehicle and a trailing vehicle, traverse the route 104, each reading data tag #1 through data tag #5 placed along the route 104. In this embodiment, the invention includes a different automated audio narration for use in each moving vehicle 102. The narrations are pre-recorded and describe features of the vehicle 102, the route 104, or any other characteristic associated with the vehicle 102, and/or a characteristic related to the other vehicle. The narration may also include instructions for navigating the vehicle relative to the other vehicle. The narration is recorded prior to allowing drivers to operate the vehicle 102. The narration includes a plurality of content items 108. In a two vehicle system, at least two content items 108 (first and second items) are associated with a corresponding data tag 106 or predetermined location along the route 104. At each data tag 106 or predetermined location, the first content item is rendered when the leading vehicle passes and the second content item is rendered when the trailing vehicle passes.

Those skilled in the art will recognize various ways to identify the leading and trailing vehicles. For example, in a closed single lane course where vehicles cannot pass each other, the vehicle processors 118 could be programmed with information indicating whether the vehicle for a particular run is a leading or trailing vehicle. Active data tags 106 may be used to keep track of vehicles as the vehicles pass the tags or a data tag 106 may have two codes and be programmed to alternatively transmit each code.

Aspects of the invention are not limited to the specific hardware and software components described and illustrated herein. For example, embodiments of the invention are operable with any software and hardware components that enable the functionality illustrated and described herein. For example, embodiments of the invention may be implemented using RFID, GPS, or any other technology known or to be developed.

Embodiments of the invention include the evaluation of vehicles on display in an enclosed building (no driving). The evaluation may include, for example, interior and exterior styling evaluations or evaluations of other features such as the entertainment system. Depending on the range of the data tags, multiple tags may be placed in the vehicle. The audio associated with each tag includes instructions to guide respondents, for example, as they self-administer a survey. Respondents hear the instructions with headphones or using the car's audio system and complete a handwritten survey.

Alternatively or in addition, a camera or other audio and/or video recording system captures the respondents' survey responses.

Embodiments of the invention are also operable with retail dynamic testing. Such testing gathers feedback regarding store layout, signage, and other variables of store configuration. For example, voice prompting and voice activated capture of the response enables gathering of the feedback from the consumer.

Exemplary Operating Environment

The invention is operable with any form of computer or computing device known in the art. The computer typically has at least some form of computer readable media, or other memory areas. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The invention also includes the computing device itself when programmed according to the methods and techniques described herein.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

A related technology within the scope of the present invention is Surface Acoustic Wave (SAW) technology. SAW technology enables a passive smart tag to achieve long ranges (e.g., up to 30 meters) using a SAW device on a chip coupled with an antenna. The SAW device converts a radio signal to an acoustic wave, modulates it with an identification code, then transforms it to another radio signal that is emitted by the smart tag and read by a scanner. The identification code of the smart tag is extracted from the radio signal.

Another related technology is ultra-wide band (UWB) technology. UWB technology permits wireless communication between objects using low-power electromagnetic transmissions. However, receivers and transmitters generally are both active but use very low power, typically less than that of radio frequency noise, relying on intermittent pulses that cover a broad band of frequencies rather than transmissions of a particular frequency. UWB technology may provide much higher spatial capacity (information transmission per unit area) than other wireless standards such as BLUETOOTH brand computer communication services or Institute of Electronics and Electrical Engineering (IEEE) 802.11a or 802.11b.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
   a device for receiving global position information from a radio navigation system, said device positioned on a vehicle, said position information describing a global position of the vehicle;
   a memory area for storing data, said data consisting of:
   (1) data defining a predetermined prescribed route;
   (2) a plurality of data elements, each defining a particular predefined location along the predetermined prescribed route, each of said data elements having a unique value and each of said data elements defining only one of the particular predefined locations along the predetermined prescribed route
   (3) a plurality of content items different from the position information and different from the particular predefined locations, each said content item associated with at least one of the plurality of particular predefined locations, said plurality of content items defining a feature of the vehicle, said feature not including instructions for navigating the vehicle;
   a presentation device positioned on the vehicle; and
   a processor positioned on the vehicle and configured to execute computer-executable instructions for:
   receiving the global position information via the device as the vehicle traverses the prescribed route;
   responsive to said receiving, comparing the received global position information to the data defining the plurality of particular predefined locations;
   when said comparing indicates that the received global position information corresponds to one of the stored particular predefined locations, selecting the content item from the plurality of content items stored in the memory area which is associated with the corresponding particular predefined location; and in response to said selecting, presenting via the presentation device the selected content item and its defined feature to an occupant of the vehicle.

2. The system of claim 1, wherein the memory area is remotely accessed via a wireless connection so that said content items defining the feature of a vehicle is remotely accessed via the wireless connection.

3. The system of claim 1, wherein the presentation device comprises one or more of the following accessed via a wireless connection: a speaker, a display, a speaker embedded in the vehicle, and a display embedded in the vehicle.

4. The system of claim 1, wherein the processor is a processor embedded in the vehicle.

5. The system of claim 1, wherein the plurality of content items comprises narration, vehicle training information, prompts, questions, and warnings.

6. The system of claim 1, further comprising a camera for capturing video data of the occupant or an audio recorder for capturing audio of the occupant.

7. The system of claim 1, further comprising another processor, located remotely from the vehicle, for receiving the captured audio and video data from the camera in real-time.

8. The system of claim 7, further comprising correlating the captured data with the presented, selected content to create an analysis of the features of the vehicle.

9. The system of claim 7, further comprising voice activation software for transcribing the captured data to enable textual queries.

* * * * *